United States Patent [19]

Stoops

[11] Patent Number: 5,021,206

[45] Date of Patent: Jun. 4, 1991

[54] METHOD OF MOLDING A DUAL PLASTIC SHOTSHELL CASING

[75] Inventor: Billie J. Stoops, Shipman, Ill.

[73] Assignee: Olin Corporation, Cheshire, Conn.

[21] Appl. No.: 439,892

[22] Filed: Nov. 21, 1989

Related U.S. Application Data

[62] Division of Ser. No. 282,549, Dec. 12, 1988, abandoned.

[51] Int. Cl.⁵ .................... B29C 43/02; B29C 45/14; B29C 45/16; B29C 45/44
[52] U.S. Cl. .................................. 264/155; 264/255; 264/274; 264/323; 102/466
[58] Field of Search .................... 264/319, 255, 328.1, 264/274, 320, 323, 325, 155; 102/46 G

[56] References Cited

U.S. PATENT DOCUMENTS

| | | | |
|---|---|---|---|
| 3,171,350 | 3/1965 | Metcalf et al. | 102/467 |
| 3,233,546 | 2/1966 | Foote et al. | 102/451 |
| 3,283,720 | 11/1966 | Foote et al. | 102/466 |
| 3,284,560 | 11/1966 | King et al. | 102/467 |
| 3,491,691 | 1/1970 | Vawter | 102/43 |
| 3,675,576 | 7/1972 | Whitney | 102/44 |
| 4,020,763 | 5/1977 | Iruretagoyena | 102/44 |
| 4,147,107 | 4/1979 | Ringdal | 102/44 |
| 4,403,933 | 9/1983 | Davis et al. | 425/129.1 |
| 4,593,621 | 6/1986 | Buchner | 102/430 |
| 4,614,157 | 9/1986 | Grelle et al. | 102/466 |
| 4,680,326 | 7/1987 | Leland et al. | 524/106 |

FOREIGN PATENT DOCUMENTS

| | | |
|---|---|---|
| 797262 | 4/1936 | France . |
| 2199860 | 4/1974 | France . |
| 672706 | 5/1952 | United Kingdom . |
| 1161422 | 8/1969 | United Kingdom . |

OTHER PUBLICATIONS

English translation of France, #2,199,860.

Primary Examiner—Jay H. Woo
Assistant Examiner—Jeremiah F. Durkin, II
Attorney, Agent, or Firm—J. R. Wahl; B. E. Burdick

[57] ABSTRACT

A dual plastic compression formed shotshell casing includes an injection-molded annular-shaped hard plastic rim and an elongated compression-formed tubular body having an integral basewad portion at its base end which is mechanically interlocked with the rim to define the final basewad of the shotshell casing. In method of making the shotshell casing, the hard plastic rim is first injection molded independently. The tubular body is then formed in a two-step process. In the first step, a plastic preform is injection molded over the rim in mechanically interlocked relation to the rim. In the second step, the tubular body is compression formed from the preform mechanically locked to the rim.

3 Claims, 1 Drawing Sheet

METHOD OF MOLDING A DUAL PLASTIC SHOTSHELL CASING

This application is a division of application Ser. No. 07/282,549, filed Dec. 12, 1988, now abandoned.

CROSS REFERENCE TO RELATED APPLICATIONS

The present invention generally relates to shotshells and, more particularly, is concerned with a dual plastic compression-formed shotshell casing and a method of making the shotshell casing.

BACKGROUND OF THE INVENTION

Historically, shotshell casings were composed of a tubular paper sidewall with a metallic base attached to one end thereof. In modern shotshell casings, a tubular sidewall made of plastic has substantially replaced the use of paper, the plastic being a superior material in terms of both performance and cost.

Several methods have been proposed in the prior art for manufacturing plastic shotshell casings. One is extrusion forming of the casing from a plastic blank as disclosed in U.S. Pat. No. 3,284,560 to King et al. Another is compression forming of the casing from a plastic blank or slug as disclosed in U.S. Pat. No. 3,171,350 to Metcalf et al, assigned to the assignee of the present invention. In the Metcalf et al patent, a cup-shaped blank is first injection molded directly into a rimmed metal base cup and, then, compression formed into the finished casing. Unlike extrusion, compression forming has proven to be a technically and economically acceptable way to manufacture plastic shotshell casings A number of different approaches appear in the prior art for constructing an all-plastic shotshell casing composed of multiple plastic parts. In a first approach of U.S. Pat. No. 3,233,546 to Foote et al, an all-plastic shotshell casing has a tubular body made by injection molding and a plastic head threaded to one end of the body.

In a second approach of U.S. Pat. No. 4,020,763 to Iruretagoyena, an all-plastic casing includes an outer case member, inner base member, and intermediate bushing member. The outer case member and inner base member are formed independently, the case member by extrusion and the base member by injection molding. Then, the case and base members are placed together and the bushing member is injection molded between them.

In a third approach of U.S. Pat. No. 4,614,157 to Grelle et al, assigned to the assignee of the present invention, an all-plastic casing is composed of an exterior tubular body, annular internal basewad, and exterior rim. The exterior tubular body is formed first by extrusion. Next, the basewad is permanently injection molded to the inside of the base end of the tubular body. Finally, the rim is injection molded into a mechanically interlocked attachment to the base wad at the base end of the body. Alternatively, the rim can be injection molded onto the base end of the tubular body and then the basewad injection molded to the body. The rim is composed of a hard and tough plastic material chemically dissimilar from and not chemically adherent to either of the other plastic parts.

However, the constructions of the above-described all-plastic, multi-part shotshell casings have not proven to be commercially acceptable. Consequently, a need still exists for an alternative approach to construction of a viable all-plastic, multi-part shotshell casing.

SUMMARY OF THE INVENTION

The present invention provides a dual plastic compression-formed shotshell casing and method of making the casing designed to satisfy the aforementioned needs. The shotshell casing of the present invention includes an injection-molded, hard plastic, annular rimmed base and an elongated compression-formed tubular body having an integral basewad portion at a base end of the tubular body being mechanically interlocked with the rimmed base.

The hard plastic rimmed base includes a conical-shaped outer annular body portion defining the final rim of the shotshell casing and a cylindrical-shaped inner annular neck portion defining a portion of the final basewad of the shotshell casing. The neck portion of the rimmed base has a radially outward-facing continuous annular groove defined in its continuous peripheral exterior surface and an axially outward-facing continuous annular recess formed at the intersection of its exterior planar base side and its continuous peripheral interior surface. During injection molding of the preform, plastic material flows and forms complementarily-shaped ring portions and recesses on the preform which provide the mechanical interlock between the rimmed base and the preform and ultimately the tubular body and integral basewad portion.

The present invention also provides a method of making the shotshell casing. In an initial operation, the hard plastic rimmed base is injection molded independently of the tubular body. Thereafter, the tubular body is then formed in a two-step process. In a first step, a quantity of plastic is injection molded over the rimmed base to produce a solid cylindrical plastic preform having an internal conical cavity and being mechanically interlocked to the rimmed base. In a second step, the preform while mechanically locked to the rimmed base is compressively deformed to produce the tubular body with the integral basewad portion at its base end being mechanically locked to the rimmed base.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWING

In the course of the following detailed description, reference will be made to the attached drawings in which.

DESCRIPTION OF THE PREFERRED EMBODIMENTS

Figure 3:
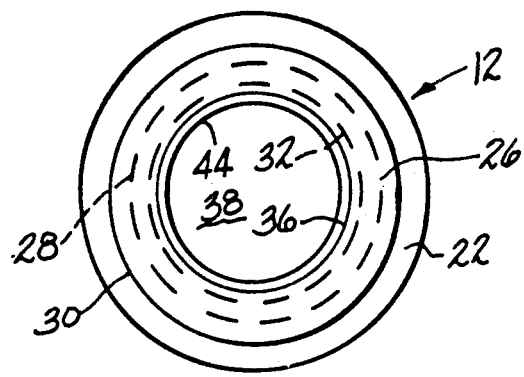
FIG. 3 is an enlarged top plan view of the plastic rimmed base of FIG. 2.
Figure 2:
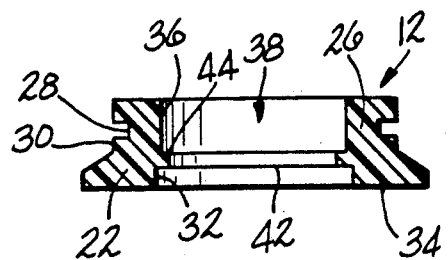
FIG. 2 is a vertical axial sectional view of a hard plastic annular rimmed base employed in the shotshell casing of FIG. 1.
Figure 4:
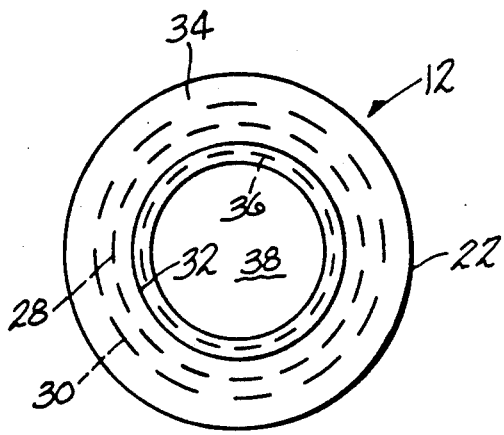
FIG. 4 is an enlarged bottom plan view of the plastic rimmed of FIG. 2.
Figure 1:
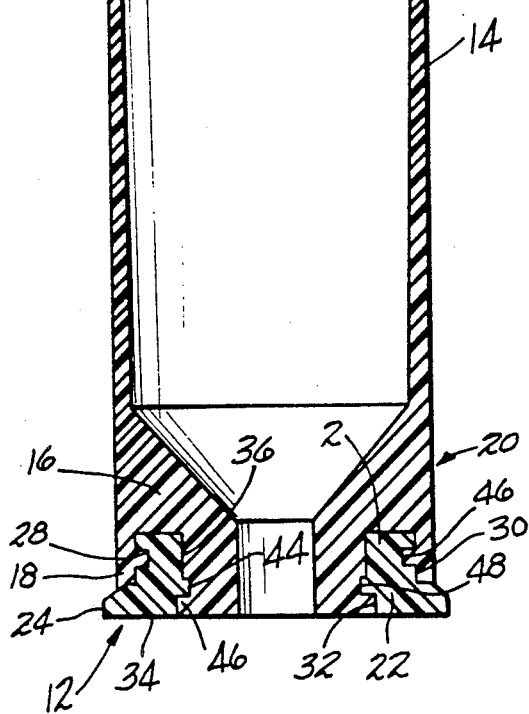
FIG. 1 is a vertical axial sectional view of the dual plastic compression-formed shotshell casing of the present invention.

Referring now to the drawings, and particularly to FIG. 1, there is shown a dual plastic compression formed shotshell casing of the present invention, generally designated by the numeral 10. Referring also to FIG. 2, the dual plastic shotshell casing 10 basically includes an injection-molded hard plastic annular rimmed base 12 having an overall part-conical/part-cylindrical shape and an elongated compression-formed tubular body 14 having an integral basewad portion 16 at the base end 18 of the body 14 being mechanically interlocked with the rimmed base 12 to together form the final basewad 20 of the shotshell casing 10.

More particularly, the hard plastic rimmed base 12 includes a conical-shaped outer annular body portion 22 defining the final rim 24 of the shotshell casing 10 and a cylindrical-shaped inner annular neck portion 26 defining an internal portion of the final basewad 20 of the shotshell casing 10. The neck portion 26 of the rimmed base 12 has a radially outward-facing continuous annular groove 28 defined in its continuous peripheral exterior surface 30 and an axially outward-facing continuous annular recess 32 formed at the intersection of its exterior planar base surface 34 and its continuous peripheral interior surface 36

Figure 5:
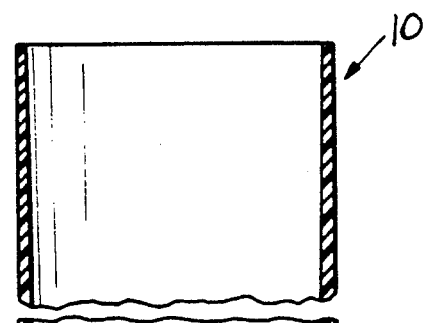
FIG. 5 is a vertical axial sectional view of a plastic preform molded to the rimmed base prior to compression forming of the shotshell casing of FIG. 1.
Figure 5:
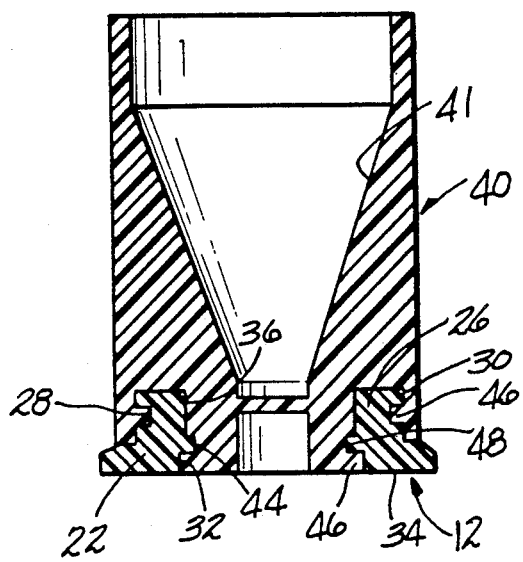

Referring to FIGS. 1, 2 and 5, manufacture of the dual plastic shotshell casing 10 of FIG. 1 begins with making the hard plastic rimmed base 12 of FIG. 2. The rimmed base 12 is formed by an injection molding process which is conventional per se. Thus, injection molding of the rimmed base 12 is performed independently of and before forming the tubular body 14 is undertaken. A hard, strong rimmed base 12 is injection molded preferably by use of a plastic material such as glass fiber reinforced, impact-modified nylon 6. The plastic material composing the hard rimmed base 12 herein should have properties comparable to those of the material composing the rim in above-cited U.S. Pat. No. 4,614,157, the disclosure of which is incorporated by reference.

Then, once molding of the rimmed base 12 is completed, the tubular body 14 is formed in a two-step process. In the first step leading to formation of the tubular body 14, the rimmed base 12 is placed in a cavity in an injection mold (not shown) and a quantity of plastic material, such as polyethylene, is injection molded over the rimmed base 12 and through a central bore 38 in the base 12 defined by its peripheral interior surface 36 to produce a plastic preform 40 shown in FIG. 5. The preform 40 so produced is a solid cylindrical plastic body as seen in FIG. 5 having an interior conical cavity 41 and being mechanically interlocked to the rimmed base 12.

It should be pointed out here that the rimmed base 12 was injection molded in a centergated mold. The gate 42 formed on the injection-molded rimmed base 12 is depicted in dashed line form in FIG. 2. Centergating allows molding of the rimmed base 12 with the physical properties required to achieve satisfactory performance in the shotshell application.

Before placing the rimmed base 12 in the mold cavity for producing the plastic preform 40, the gate 42 is punched out to allow the plastic material composing the preform 40 to flow through the interior of the base 12, as well as around the exterior thereof, and mechanically lock to the base. Punching out the gate 42 leaves an annular ledge 44 in the central bore 38 of the rimmed base 12. Thus, in injection molding of the preform 40, plastic material flows about the exterior and interior surfaces 30, 36 of the base 12 and forms complementarily-shaped ring portions 46 on and recesses 48 in the preform 40 which interfit with and fill the groove 28 and recess 32, and encompass the ledge 44, of the rimmed base 12 to provide the mechanical interlock between the rimmed base 12 and the preform 40 and ultimately the tubular body 14 and integral basewad portion 16.

In the second step leading to formation of the tubular body 14, the preform 40 is placed in a compression forming mold (not shown) and the mold is heated to an elevated temperature, such as 220-250 degrees F., below the melting point of the material, such as polyethylene, composing the preform 40. The mold is closed and a forming punch (not shown) is forced in a conventional manner into the preform so as to compressively deform the preform 40, thereby forming it into the tubular body 14 and integral basewad portion 16 of the shotshell casing 10. Thus, the preform 40 is compression formed in such manner that the portion of the preform 40 mechanically locked to the rimmed base 12 becomes the base end portions of the tubular body 14 and final integral basewad 20 of the shotshell casing 10.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely a preferred or exemplary embodiment thereof.

I claim:

1. A method of making a dual plastic shotshell casing comprising the steps of:
   (a) injection molding independently a hard plastic annular-shaped rimmed base; and
   (b) forming a plastic tubular body in a two-step operation by
      (1) first, injection molding a plastic preform onto said rimmed base, said preform having an integral basewad in mechanically interlocked relation to the rimmed base, and;
      (2) second, compression forming the tubular body into said casing from the preform mechanically locked to the rimmed base.

2. The method as recited in claim 1 further comprising heating the preform to an elevated temperature just below the melting point of the material of the preform prior to compression forming the tubular body.

3. A method of making a dual plastic shotshell casing comprising the steps of:
   (a) injection molding independently a hard plastic annular-shaped rimmed base having a central axial bore therethrough with a center gate across said bore;
   (b) punching out the center gate leaving an annular ledge in said central bore; (b) forming a plastic tubular body in a two-step operation by:
      (1) first, injection molding a plastic preform onto said rimmed base, said preform having an integral basewad in mechanically interlocked relation to the rimmed base, said basewad engaging said annular ledge and;
      (2) second, compression forming the tubular body into said casing form the preform mechanically locked to the rimmed base.

* * * * *